United States Patent
Imagawa et al.

(10) Patent No.: US 10,697,821 B2
(45) Date of Patent: Jun. 30, 2020

(54) WEIGHT CALIBRATION FOR A VEHICLE WEIGHT LOAD DETERMINATION METER

(71) Applicant: Panasonic Intellectual Property Management Co., Ltd., Osaka (JP)

(72) Inventors: Taro Imagawa, Osaka (JP); Akihiro Noda, Nara (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 171 days.

(21) Appl. No.: 15/886,891

(22) Filed: Feb. 2, 2018

(65) Prior Publication Data

US 2018/0245969 A1 Aug. 30, 2018

Related U.S. Application Data

(63) Continuation of application No. PCT/JP2017/023012, filed on Jun. 22, 2017.

(30) Foreign Application Priority Data

Feb. 28, 2017 (JP) .................................. 2017-036228

(51) Int. Cl.
*G01G 23/01* (2006.01)
*G01G 9/00* (2006.01)
(Continued)

(52) U.S. Cl.
CPC ............ *G01G 23/01* (2013.01); *G01G 9/005* (2013.01); *G01G 19/022* (2013.01); *G01G 19/08* (2013.01)

(58) Field of Classification Search
CPC ....... G01G 23/01; G01G 9/005; G01G 19/022
(Continued)

(56) References Cited

U.S. PATENT DOCUMENTS

| | | | | |
|---|---|---|---|---|
| 4,813,004 A | * | 3/1989 | Fujioka | ............... G01G 19/022 340/666 |
| 6,552,278 B2 | * | 4/2003 | Johnson | ............... G01G 19/021 177/134 |

(Continued)

FOREIGN PATENT DOCUMENTS

| | | |
|---|---|---|
| EP | 1 927 827 | 6/2008 |
| JP | 50-034268 | 4/1975 |

(Continued)

OTHER PUBLICATIONS

Translation JP-2009168715 (Year: 2009).*

(Continued)

*Primary Examiner* — Natalie Huls
*Assistant Examiner* — Monica S Young
(74) *Attorney, Agent, or Firm* — Wenderoth, Lind & Ponack, L.L.P.

(57) ABSTRACT

A calibration device is a calibration device configured to calibrate a load meter that measures an axle load of a vehicle. The calibration device includes a detector and a calibrator. The detector detects a displacement amount corresponding to displacement caused on a road by the axle load of the vehicle. The calibrator aggregates the displacement amounts detected by the detector to generate a histogram of the displacement amounts, and updates a displacement coefficient for calculating the axle load of the vehicle based on a shape of the histogram. The calibrator updates the displacement coefficient base only on the shape of the histogram corresponding to a first axle serving as a forefront axle of the vehicle.

11 Claims, 11 Drawing Sheets

Figure 1:
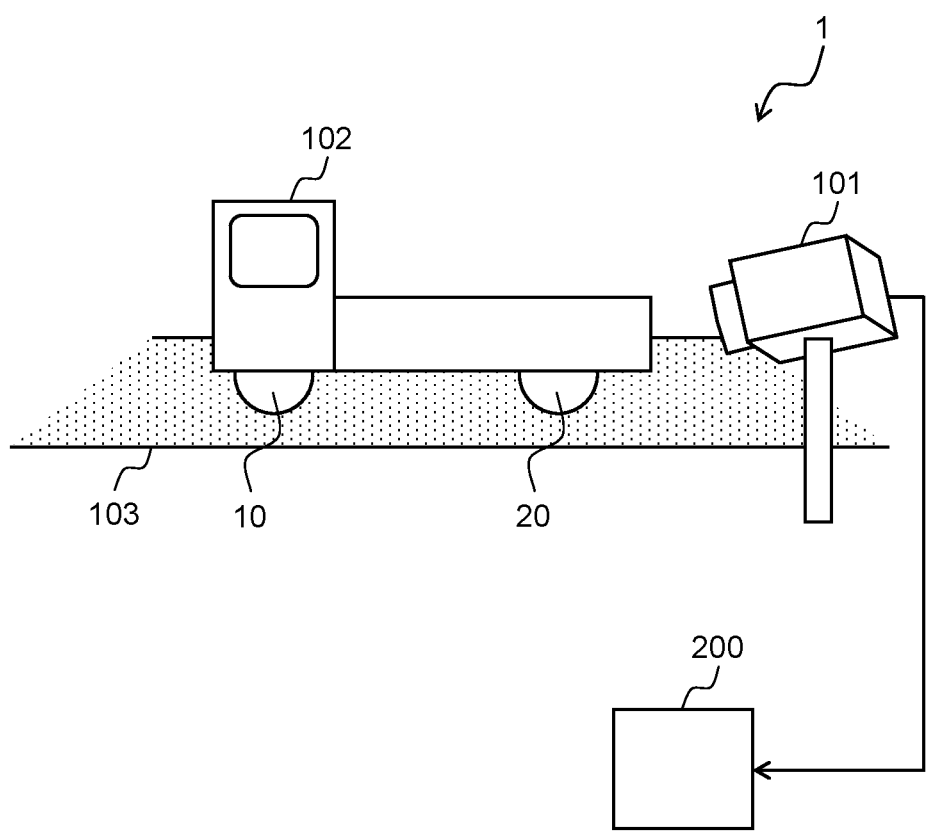

(51) Int. Cl.
*G01G 19/02* (2006.01)
*G01G 19/08* (2006.01)

(58) Field of Classification Search
USPC .......................................................... 177/1
See application file for complete search history.

(56) References Cited

U.S. PATENT DOCUMENTS

| | | | | |
|---|---|---|---|---|
| 8,165,775 B2* | 4/2012 | Nakamura | ............ | B60W 30/16 |
| | | | | 701/72 |
| 2006/0137914 A1* | 6/2006 | Hodac | ................. | G01G 19/024 |
| | | | | 177/132 |
| 2011/0267200 A1* | 11/2011 | Reynolds | ............ | G01G 19/024 |
| | | | | 340/666 |
| 2012/0160574 A1* | 6/2012 | Nishimura | .............. | E01F 11/00 |
| | | | | 177/133 |
| 2013/0070086 A1* | 3/2013 | Seifert | ................ | G01B 11/275 |
| | | | | 348/135 |
| 2016/0187183 A1* | 6/2016 | Cornu | ................. | G01G 19/024 |
| | | | | 177/132 |
| 2017/0234722 A1* | 8/2017 | Mount | .................. | G01G 23/01 |
| | | | | 702/101 |
| 2017/0307360 A1 | 10/2017 | Imai | | |
| 2018/0274966 A1* | 9/2018 | Jurik | ....................... | G01G 3/12 |

FOREIGN PATENT DOCUMENTS

| | | | |
|---|---|---|---|
| JP | 04328427 A | * | 11/1992 |
| JP | 6-018319 | | 1/1994 |
| JP | 08-293090 | | 11/1996 |
| JP | 2005-030786 | | 2/2005 |
| JP | 2005-061984 | | 3/2005 |
| JP | 2009-168715 | | 7/2009 |
| JP | 2009168715 A | * | 7/2009 |
| JP | 2010-261825 | | 11/2010 |
| JP | 2010261825 A | * | 11/2010 |
| JP | 2017-058177 | | 3/2017 |
| WO | 2016/047093 | | 3/2016 |

OTHER PUBLICATIONS

Translation JP-04328427 (Year: 1992).*
Translation JP-2010261825 (Year: 2010).*
International Search Report of PCT application No. PCT/JP2017/023012 dated Aug. 22, 2017.
International Search Report and Written Opinion dated Mar. 27, 2018 in International Application No. PCT/JP2018/001120.
Extended European Search Report dated Mar. 3, 2020 in corresponding European Patent Application No. 18760961.5.

* cited by examiner

FIG. 3

| X \ Y | RANGE 1 (1~10 PIXELS) | RANGE 2 (11~20 PIXELS) | RANGE 3 (21~30 PIXELS) | ... |
|---|---|---|---|---|
| RANGE 1 (1~10 PIXELS) | 5 | 4.5 | 5 | ... |
| RANGE 2 (11~20 PIXELS) | 6 | 5 | 5 | ... |
| RANGE 3 (21~30 PIXELS) | 4 | 4 | 4 | ... |
| ⋮ | ⋮ | ⋮ | ⋮ | ⋮ |

WEIGHT CALIBRATION FOR A VEHICLE WEIGHT LOAD DETERMINATION METER

TECHNICAL FIELD

The present disclosure relates to a calibration device for calibrating a load meter that measures a load of a vehicle or the like.

BACKGROUND ART

Conventionally, a method for correcting a load meter that measures an axle load of a vehicle or the like has been known.

For example, PTL 1 discloses a load meter correction method for correcting a load meter. According to this method, when a vehicle whose axle load is known passes along a road, the load meter can be corrected by using an output of a load sensor buried in the road.

CITATION LIST

Patent Literature

PTL 1: Unexamined Japanese Patent Publication No. 2010-261825

SUMMARY

In the above-described conventional load meter correction method, it is necessary to allow the vehicle whose axle load is known to pass along the road and to obtain the output of the load sensor when the vehicle passage. Accordingly, a certain degree of cost and labor is required for preparing a dedicated vehicle, confirming the passage of the vehicle, or the like.

Therefore, the present disclosure provides a calibration device and a calibration method that can keep labor and cost for calibration of a load meter lower than conventionally.

A calibration device according to one aspect of the present disclosure is a calibration device configured to calibrate a load meter that measures an axle load of a vehicle. The calibration device includes a detector and a calibrator. The detector detects a displacement amount corresponding to displacement caused on a road by the axle load of the vehicle. The calibrator aggregates the displacement amounts detected by the detector to generate a histogram of the displacement amounts, and updates a displacement coefficient for calculating the axle load of the vehicle based on a shape of the histogram. The calibrator updates the displacement coefficient based only on the shape of the histogram corresponding to a first axle serving as a forefront axle of the vehicle.

A calibration method according to one aspect of the present disclosure is a calibration method for calibrating a load meter that measures an axle load of a vehicle. The calibration method includes detecting, aggregating, and updating. In the detecting, a displacement amount corresponding to displacement caused on a road by the axle load of the vehicle is detected. In the aggregating, the displacement amounts detected in the detecting are aggregated to generate a histogram of the displacement amounts. In the updating, a displacement coefficient for calculating the axle load of the vehicle based on a shape of the histogram. In the updating, the displacement coefficient is updated based only on the shape of the histogram corresponding to a first axle serving as a forefront axle of the vehicle.

According to the calibration device and the calibration method pertaining to the present disclosure, labor and cost for calibration of a load meter can be kept lower than conventionally.

BRIEF DESCRIPTION OF DRAWINGS

FIG. 1 is a view schematically illustrating one example of a state in which an axle load is measured according to a first exemplary embodiment.

FIG. 2 is a block diagram illustrating a configuration of a load meter according to the first exemplary embodiment.

FIG. 3 is a configuration table of displacement coefficient data.

FIG. 4A is a flowchart for describing an operation of a first measurement process.

FIG. 4B is a flowchart for describing an operation of a calibration process.

FIG. 5 is a view illustrating one example of captured image A.

FIG. 6 is a view illustrating one example of a captured image.

FIG. 7 is a view illustrating one example of captured image B.

FIG. 8A is a diagram illustrating one example of a histogram generated by a calibrator.

FIG. 8B is a diagram illustrating one example of the histogram generated by the calibrator.

FIG. 8C is a diagram illustrating one example of a histogram of axle load values acquired in advance.

FIG. 8D is a diagram illustrating one example of a histogram generated by a calibrator according to a modified example.

FIG. 9 is a view schematically illustrating one example of a state in which an axle load is measured according to a second exemplary embodiment.

FIG. 10 is a block diagram illustrating a configuration of a load meter according to the second exemplary embodiment.

DESCRIPTION OF EMBODIMENTS

A calibration device according to one aspect of exemplary embodiments is a calibration device configured to calibrate a load meter that measures a load of a vehicle. The calibration device includes a detector and a calibrator. The detector detects a displacement amount corresponding to displacement caused on a road by the load of the vehicle. The calibrator aggregates the displacement amounts detected by the detector to generate a histogram of the displacement amounts, and updates a displacement coefficient for calculating the load of the vehicle based on a shape of the histogram.

With this configuration, this calibration device can calibrate, only from measurement of a load of an ordinary vehicle, the displacement coefficient to be used when the load meter measures the load.

Accordingly, calibration of the load meter can be performed frequently and at a low cost.

It is to be noted that these generic or specific aspects may be implemented by using a system, a method, an integrated circuit, a computer program, or a computer-readable recording medium such as a compact disc read only memory (CD-ROM), and may also be implemented by any combination of the system, the method, the integrated circuit, the computer program, and the recording medium.

A specific example of the calibration device according to one aspect of the present disclosure will be described below. It should be noted that each of the exemplary embodiments described hereafter illustrates one preferred specific example of the present disclosure. Numerical values, shapes, materials, components, arrangement positions and connection configurations of the components, steps, processing order of the steps, and the like shown in the following exemplary embodiments are mere examples, and are not intended to limit the present disclosure. The present disclosure is limited only by the scope of the claims. Accordingly, among the components in the following exemplary embodiments, components that are not described in any of independent claims indicating the most generic concept of the present disclosure are not essential for achieving the object of the present disclosure but are described as preferable components.

First Exemplary Embodiment

As one aspect of the present disclosure, a load measuring system installed in a road on which ordinary vehicles travel will be described herein.

It is assumed herein that a calibration device is operated by being incorporated in a load meter that constitutes the load measuring system. The load meter and the calibration device according to the present disclosure will be described below with reference to the drawings.

1-1. Configuration

FIG. 1 is a view schematically illustrating one example of a state in which load meter 200 according to a first exemplary embodiment measures an axle load of vehicle 102. As illustrated in FIG. 1, load measuring system 1 according to the first exemplary embodiment includes imaging device 101 and load meter 200.

Herein, for example, load meter 200 is connected to imaging device 101 for capturing an image of road 103 on which vehicle 102 travels. Moreover, a plurality of captured images of road 103 captured by imaging device 101 is input to load meter 200. Load meter 200 uses the input captured images, thereby calibrating a displacement coefficient to be used when the axle load of vehicle 102 is calculated. For example, vehicle 102 is a truck, and road 103 is an asphalt road.

Figure 2:
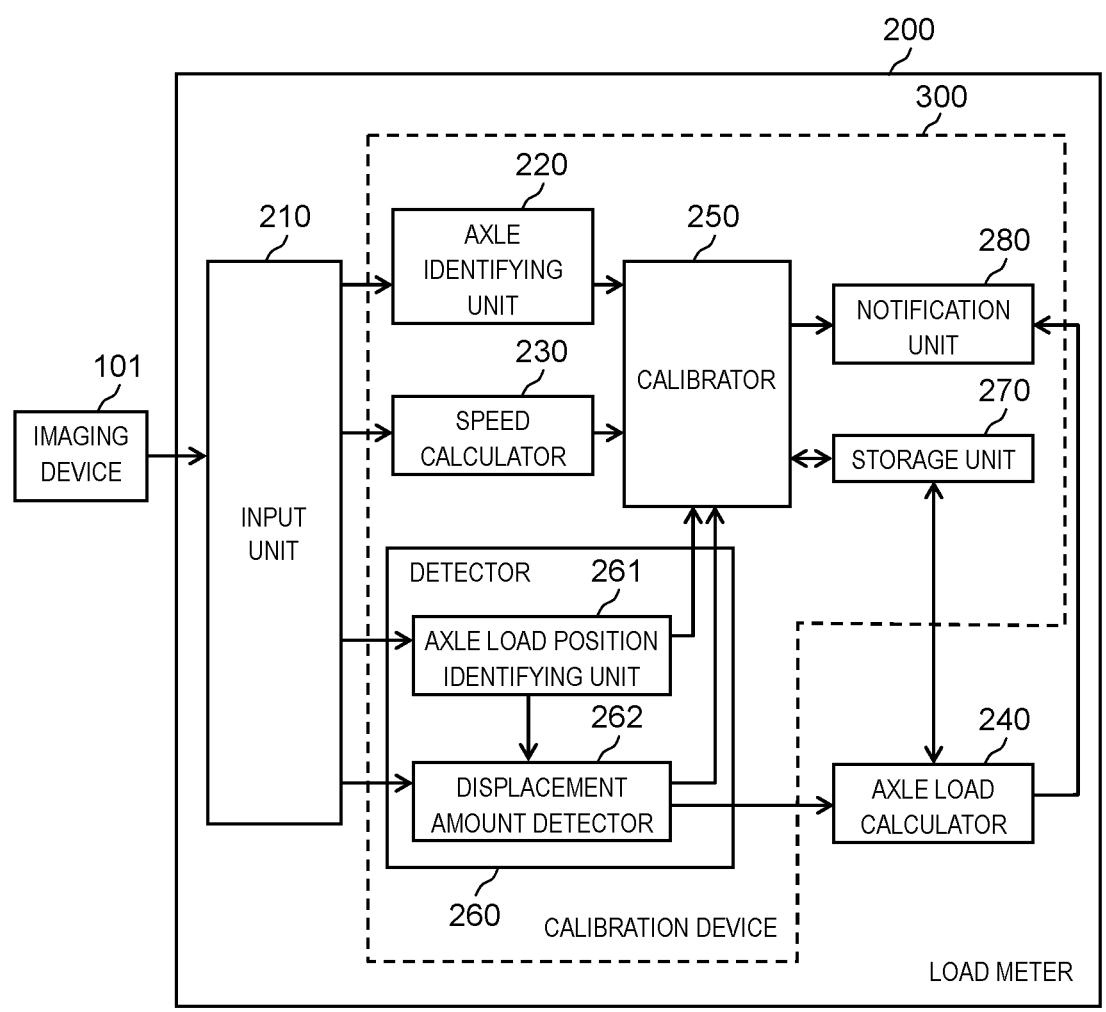

FIG. 2 is a block diagram illustrating a configuration of load meter 200. As illustrated in FIG. 2, load meter 200 includes input unit 210, axle load calculator 240, and calibration device 300. Calibration device 300 includes axle identifying unit 220, speed calculator 230, calibrator 250, detector 260, storage unit 270, and notification unit 280. In addition, detector 260 includes axle load position identifying unit 261 and displacement amount detector 262. Calibration device 300 is a calibration device for calibrating load meter 200 that measures an axle load of a vehicle.

For example, load meter 200 is implemented in such a way that a microprocessor (not illustrated) in a computer (not illustrated) provided with the microprocessor and a memory (not illustrated) executes a program stored in the memory.

Input unit 210 receives an input of the plurality of captured images of the road captured by imaging device 101. Herein, input unit 210, for example, receives an input of a digital image with 4096 pixels×2160 pixels as the captured image. Input unit 210 outputs the received captured images to axle identifying unit 220, speed calculator 230, axle load position identifying unit 261, and displacement amount detector 262.

The captured images are input through wireless or wired communication or through a recording medium.

Detector 260 detects, at a predetermined point, a displacement amount corresponding to displacement caused on a road surface of a road when a vehicle passes.

When a vehicle is included in the captured image received by input unit 210, axle load position identifying unit 261 identifies an axle load position of the vehicle in the captured image. More specifically, axle load position identifying unit 261 performs image recognition processing on the captured image to determine whether or not the vehicle is included in the captured image. Then, when the vehicle is included in the captured image, axle load position identifying unit 261 recognizes a tire of the vehicle by further image recognition processing. Axle load position identifying unit 261 then identifies an area on the road, which corresponds to a lowermost point of the tire, as an axle load position. Axle load position identifying unit 261 outputs the identified axle load position to calibrator 250 and displacement amount detector 262.

Displacement amount detector 262 detects, by using the captured image received by input unit 210, a displacement amount in the captured image corresponding to displacement caused on the road when an axle load is applied. Particularly, when the axle load position is input from axle load position identifying unit 261, displacement amount detector 262 detects a displacement amount corresponding to displacement at the identified axle load position. Displacement amount detector 262 detects the displacement amount corresponding to the displacement by comparing a captured image in which no displacement is caused on the road and a captured image in which displacement is caused on the road, from among the plurality of captured images received by input unit 210. Displacement amount detector 262 can detect the displacement amount between the captured images by using block matching, a correlation method, or an optical flow. For example, displacement amount detector 262 calculates, as the displacement amount, a number of pixels that indicates a difference in pixel position corresponding to an identical point on the road between the captured images. Further, the captured image in which no displacement is caused on the road may be a captured image in which the road is captured in advance in a state in which the vehicle is not present, a captured image in which an image change amount is a certain level or lower among a plurality of images captured in succession, or a captured image determined that the vehicle is not present through the image recognition processing.

When the vehicle is included in the captured image received by input unit 210, axle identifying unit 220 identifies what number axle from a front (or a rear) is the axle of the vehicle in the captured image. More specifically, axle identifying unit 220 performs the image recognition processing on the captured image to determine whether or not the vehicle is included in the captured image. Then, when the vehicle is included in the captured image, axle identifying unit 220 recognizes the axle of the vehicle by further image recognition processing. Axle identifying unit 220 then identifies an axle number from the front for each vehicle. Axle identifying unit 220 outputs the identified axle number to calibrator 250. Here, as illustrated in FIG. 1, axle identifying unit 220, for example, identifies a forefront axle of vehicle 102 as first axle 10. Further, axle identifying unit 220, for example, identifies a subsequent axle as second axle 20.

When the vehicle is included in the captured image received by input unit 210, speed calculator 230 calculates a speed of the vehicle. More specifically, speed calculator 230 performs the image recognition processing on the captured image to determine whether or not the vehicle is included in the captured image. Then, speed calculator 230 calculates the speed of the vehicle based on a difference in position of an identical vehicle between different frames (for example, between adjacent frames). By previously measuring a positional relation between imaging device 101 and the road, speed calculator 230 can geometrically perform scale conversion between a movement amount in the captured image and an actual movement amount. Speed calculator 230 outputs the calculated speed to calibrator 250.

Calibrator 250 aggregates the displacement amounts detected by detector 260 to generate a histogram of the displacement amounts. Then, calibrator 250 updates the displacement coefficient based on a shape of the histogram of the displacement amounts.

Calibrator 250 aggregates the displacement amounts detected by detector 260 for the plurality of captured images in which different vehicles are captured. Particularly, when the axle load position is identified by axle load position identifying unit 261, calibrator 250 aggregates the displacement amounts by associating the identified axle load position and the displacement amount with each other. Similarly, calibrator 250 aggregates the displacement amounts by dividing the displacement amounts for each axle number identified by axle identifying unit 220 and for each speed calculated by speed calculator 230. For example, calibrator 250 aggregates the displacement amounts by dividing the displacement amounts for the first axle and the second axle. Further, calibrator 250, for example, aggregates the displacement amounts by dividing the displacement amounts for a low speed (for example, 0 km/h to 30 km/h), a medium speed (for example, 30 km/h to 60 km/h), a high speed (for example, 60 km/h or more), and the like. Calibrator 250 may aggregate the displacement amounts by combining all the conditions, or may aggregate the displacement amounts by combining only a part of the conditions. Further, calibrator 250 may aggregate the displacement amounts by combining only the condition, such as the first axle (the foremost axle of the vehicle), and the condition, such as 30 km/h or more. By dividing (or limiting) the conditions, calibrator 250 can easily obtain a characteristic of the histogram of the displacement amounts, which will be described below.

Storage unit 270 stores first information indicating a relation between the axle load and the displacement amount. More specifically, the first information is a relational expression indicating the relation between the axle load and the displacement amount when the displacement is caused on the road due to application of the axle load to the road, and a displacement coefficient used for this relational expression. Storage unit 270 may be implemented by a memory (not illustrated) included in load meter 200 or a database of an external device capable of performing communication.

Axle load w (kg) is a function of displacement amount d (a number of pixels). In other words, axle load w is represented by an expression of $w=f(d)$ using function f. Herein, function f is handled after being approximated with a primary expression. Accordingly, storage unit 270 stores the primary expression ($w=\alpha d$) as the relational expression. Further, storage unit 270 stores coefficient $\alpha$ as the displacement coefficient.

This displacement coefficient $\alpha$ has a displacement coefficient value associated with each of a plurality of positions that can be identified as an axle load position by axle load position identifying unit 261. With this configuration, differences including a difference in distance from imaging device 101 to the axle load position, a difference in composition of a material such as asphalt, a difference in road surface temperature, and a difference in deterioration state of the road surface can be reflected on displacement coefficient $\alpha$ for each area on the road. Herein, displacement coefficient $\alpha$ has, for each area (hereinafter written as "local area") of 10 pixels in a horizontal direction (x direction) and 10 pixels in a vertical direction (y direction), for example, in the captured image, a displacement coefficient value corresponding to the local area.

FIG. 3 is a table illustrating one example of displacement coefficient $\alpha$ stored in storage unit 270.

Storage unit 270 stores a predetermined relational expression and a predetermined displacement coefficient in an initial state. When a displacement coefficient is newly calculated by calibrator 250, the stored displacement coefficient is updated by the newly calculated displacement coefficient.

Axle load calculator 240 calculates an axle load of a vehicle present on the road based on the displacement amount detected by detector 260 and the first information stored in storage unit 270. Particularly, when the axle load position is identified by axle load position identifying unit 261, axle load calculator 240 calculates the axle load based on the displacement amount at the identified axle load position. More specifically, axle load calculator 240 calculates axle load w by multiplying displacement amount d detected by displacement amount detector 262 by a displacement coefficient value corresponding to an area including the axle load position identified by axle load position identifying unit 261. Further, storage unit 270 may store the axle number identified by axle identifying unit 220 and the displacement coefficient according to the speed calculated by speed calculator 230. Moreover, axle load calculator 240 may calculate an axle load by using the axle number of the vehicle and the displacement coefficient according to the speed.

Further, storage unit 270 stores second information pertaining to the axle load. The second information is an axle load value of the first axle of the vehicle in which a traffic frequency is expected to be highest in road 103.

Calibrator 250 calculates a displacement coefficient for identifying the relation between the axle load and the displacement amount based on the displacement amount detected by displacement amount detector 260 and the second information. Then, calibrator 250 updates the displacement coefficient stored in storage unit 270 by using the calculated displacement coefficient. A detail of a method for calculating the displacement coefficient will be described in a calibration process, which will be described below.

When a difference between the displacement coefficient newly calculated by calibrator 250 and the first information is a predetermined reference value or more, notification unit 280 notifies outside of the system of this situation. For example, after notification unit 280 notifies an external user through wired or wireless communication, calibrator 250 may update the displacement coefficient based on a judgment of the user.

An operation of load meter 200 (particularly calibrator 250) having the above configuration will be described with reference to the drawings hereafter.

1-2. Operation

Load meter 200 performs, as its characteristic operation, a first measurement process and the calibration process.

[1-2-1. First Measurement Process]

The first measurement process is a process, when a captured image including a vehicle is input to load meter 200, for calculating an axle load of the vehicle.

Figure 4A:
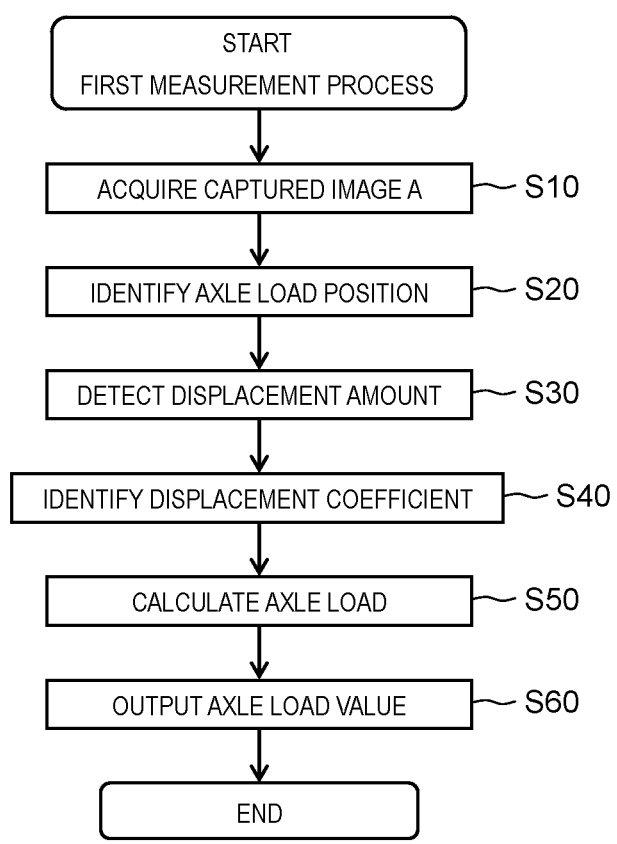

FIG. 4A is a flowchart for describing an operation of the first measurement process. This first measurement process is started when the captured image including the vehicle (hereinafter written as "captured image A") is input to input unit 210.

When the first measurement process is started, input unit 210 acquires captured image A input from imaging device 101 (step S10).

Figure 5:
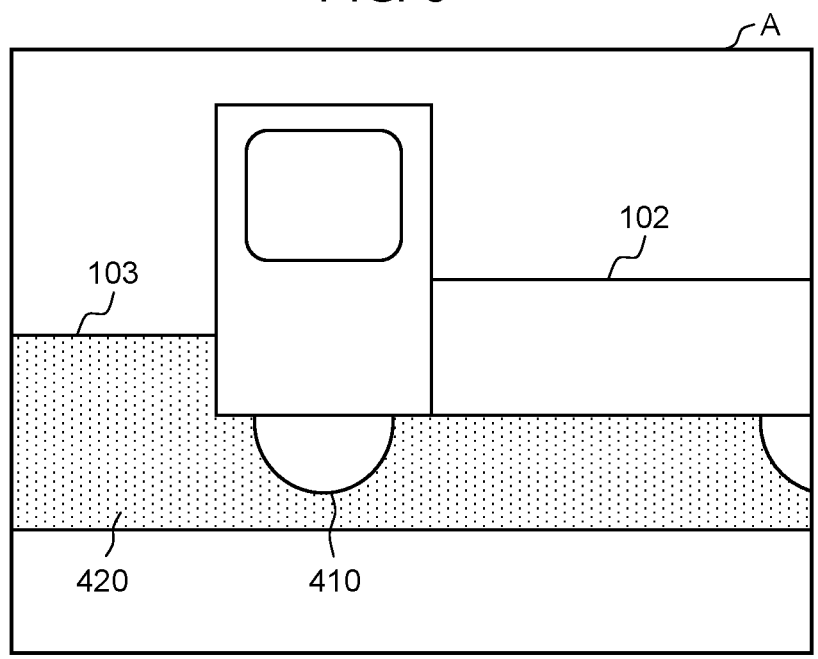

FIG. 5 is a view illustrating one example of captured image A acquired. As illustrated in FIG. 5, captured image A includes vehicle 102 traveling on road 103. Also, this vehicle 102 is in contact with road 103 at lowermost point 410 of the tire of vehicle 102. Further, in FIG. 5, area 420 includes a point that is not identified as an axle load position.

In FIG. 4A, upon the acquisition of captured image A, axle load position identifying unit 261 performs image recognition processing to identify lowermost point 410 of the tire of vehicle 102. Then, axle load position identifying unit 261 identifies an area on road 103, which corresponds to identified lowermost point 410, as the axle load position (step S20).

Figure 6:
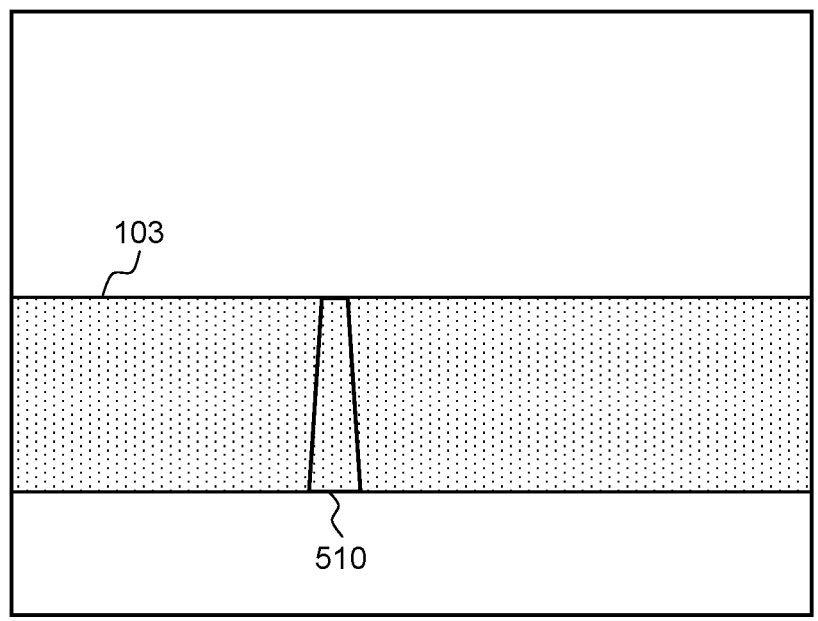

Herein, the area identified by axle load position identifying unit 261 may not necessarily be an area consisting only of one point (one pixel). The area identified by axle load position identifying unit 261 may be a local image area consisting of a plurality of adjacent pixels. It is to be noted that axle load position identifying unit 261 may limit an axle load detection range in which an axle load is detected to an area of road 103. Further, axle load position identifying unit 261 may limit the axle load detection range in which the axle load is detected to a part of road 103, as in area 510 in FIG. 6. Axle load position identifying unit 261 may limit the detection range according to designation of a user, or may limit the detection range according to the designation of the user and a result of image recognition of a color or a texture of road 103. Limiting the axle load detection range provides an effect of reducing an image processing amount. Therefore, the image processing amount for identifying the axle load position can be reduced. It is to be noted that, when a plurality of tires is in contact with road 103 in the captured image, axle load position identifying unit 261 identifies each contact position as the axle load position.

Upon the identification of the axle load position, displacement amount detector 262 detects a displacement amount corresponding to displacement caused at the identified axle load position on road 103 (step S30). Displacement amount detector 262 detects the displacement amount by using captured image A and a captured image in which no displacement is caused (hereinafter written as "captured image B") from among the captured images acquired by input unit 210. If captured image B has not been acquired by input unit 210 before the axle load position is identified, displacement amount detector 262 waits until captured image B is acquired by input unit 210, and then detects the displacement amount.

Figure 7:
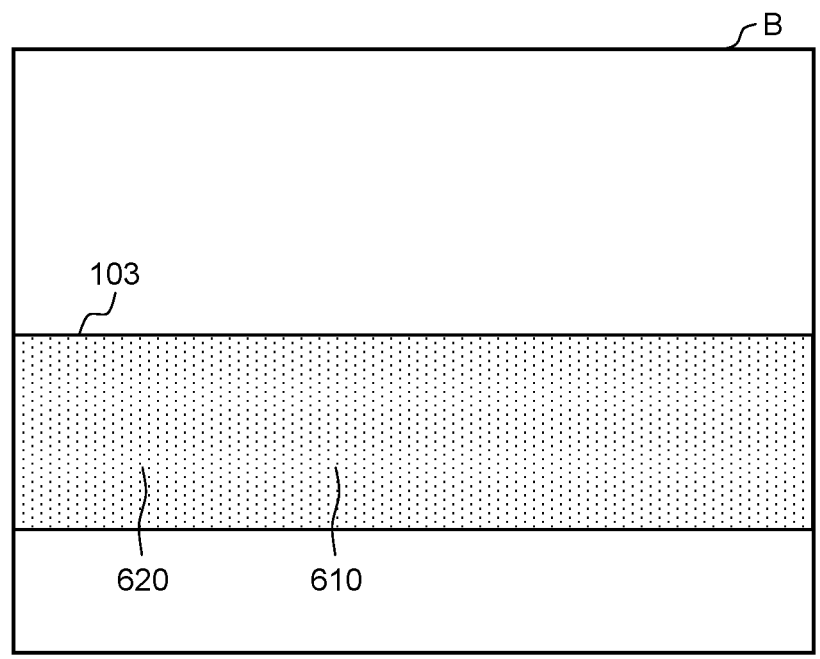

FIG. 7 is one example of captured image B acquired. Road 103 is imaged from an identical point of view in captured image A (see FIG. 5) and captured image B. Area 610 on road 103 in captured image B is an area identical to the area on road 103, which corresponds to lowermost point 410 of the tire, in captured image A. Further, area 620 on road 103 in captured image B is an area identical to area 420 on road 103 in captured image A.

Displacement amount detector 262 detects a displacement amount caused between an area on road 103, which corresponds to lowermost point 410, in captured image A, and area 610 in captured image B. Herein, since a displacement amount on road 103 caused by an axle load of an ordinary vehicle is very small, it is desirable to suppress an effect of shake of imaging device 101 due to vibration or the like of the vehicle traveling on road 103. As one example, displacement amount detector 262 selects, in both captured image A and captured image B, an identical point that is not identified as the axle load position (for example, area 420 in captured image A and area 620 in captured image B). Then, displacement amount detector 262 calculates a displacement amount between the selected areas (hereinafter written as a "non-axle load position displacement amount"). Displacement amount detector 262 subtracts this non-axle load position displacement amount from a displacement amount caused between the area on road 103, which corresponds to lowermost point 410 of the tire, in captured image A, and area 610 in captured image B. Accordingly, displacement amount detector 262 corrects the displacement amount. Thus, the effect of the shake of imaging device 101 can be suppressed. Besides, the effect of the shake of imaging device 101 can be also suppressed by a method using an optical image stabilization technology, a method using a mechanical mechanism such as a sensor shift method, or the like.

In FIG. 4A, upon the detection of the displacement amount, axle load calculator 240 identifies a displacement coefficient value corresponding to the axle load position identified by axle load position identifying unit 261 (step S40). In other words, axle load calculator 240 refers to displacement coefficient α stored in storage unit 270 (see FIG. 3) to identify a displacement coefficient value corresponding to the axle load position identified by axle load position identifying unit 261.

Upon the identification of the displacement coefficient value, axle load calculator 240 multiplies the identified displacement coefficient value by the displacement amount detected by displacement amount detector 262 to calculate an axle load (step S50).

Upon the calculation of the axle load, axle load calculator 240 outputs a numerical value of the calculated axle load to outside (step S60). Herein, when the numerical value of the calculated axle load is greater than a predetermined reference value, axle load calculator 240 may notify the user of this situation through notification unit 280, instead of outputting the numerical value of the calculated axle load to the outside. In this case, the reference value may be an absolute value or may be a relative value. In addition, for example, when the reference value is more than or equal to 30 times a representative value of a histogram described below, axle load calculator 240 may notify the user of this situation after storing the corresponding captured image. With this configuration, the user can be notified of a relatively high possibility that the vehicle included in the corresponding captured image is overloaded.

After the process in step S60 is ended, load meter 200 ends the first measurement process.

[1-2-2. Calibration Process]

The calibration process is a process in which calibrator 250 updates the displacement coefficient stored in storage unit 270.

Figure 4B:
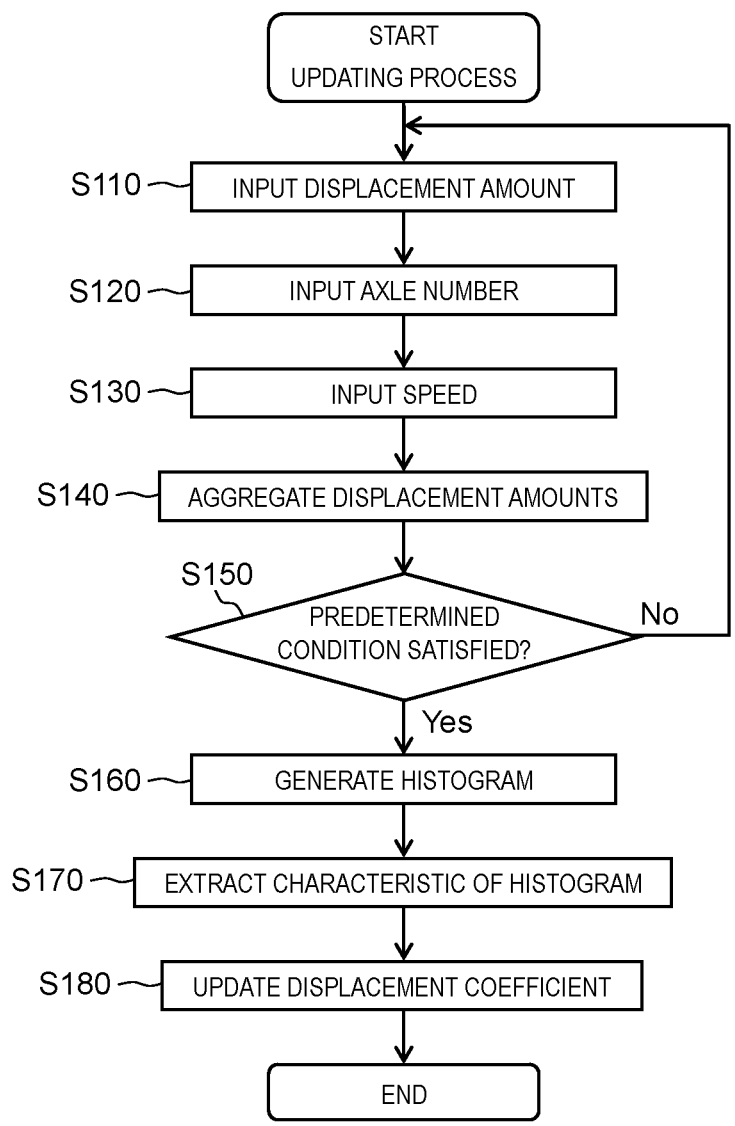

FIG. 4B is a flowchart of the calibration process. This calibration process is started when load meter 200 is activated.

When the calibration process is started, in a case where a load position is identified by axle load position identifying unit 261, calibrator 250 inputs a displacement amount every time the displacement amount is detected by displacement amount detector 262 (step S110). Similarly, calibrator 250 inputs an axle number from axle identifying unit 220 (step S120), and inputs a speed from speed calculator 230 (step S130). Calibrator 250 aggregates displacement amounts by associating the detected displacement amount with every condition of the identified axle load position, the axle number, and the speed (step S140). Herein, calibrator 250 may not generate a histogram of displacement amounts for combinations of all the conditions, and may generate a histogram of displacement amounts for only a limited condition, such as a combination of a specific axle number and a specific speed. It is to be noted that steps S110 to S130 may not be provided in this order.

Herein, calibrator 250 aggregates the detected displacement amounts for each local area associated with the displacement coefficient value.

Load meter 200 repeats the processes in steps S110 to S140 until a predetermined condition is satisfied. Herein, the predetermined condition corresponds to, for example, a case where a predetermined date has come, a case where a predetermined number of displacement amounts is aggregated, or a case where the user performs a predetermined operation to load meter 200.

When the predetermined condition is satisfied in the process in step S150 (Yes in step S150), calibrator 250 generates a histogram of displacement amounts aggregated in a certain period in the past for each local area based on an obtained aggregation result (step S160).

Figure 8A:
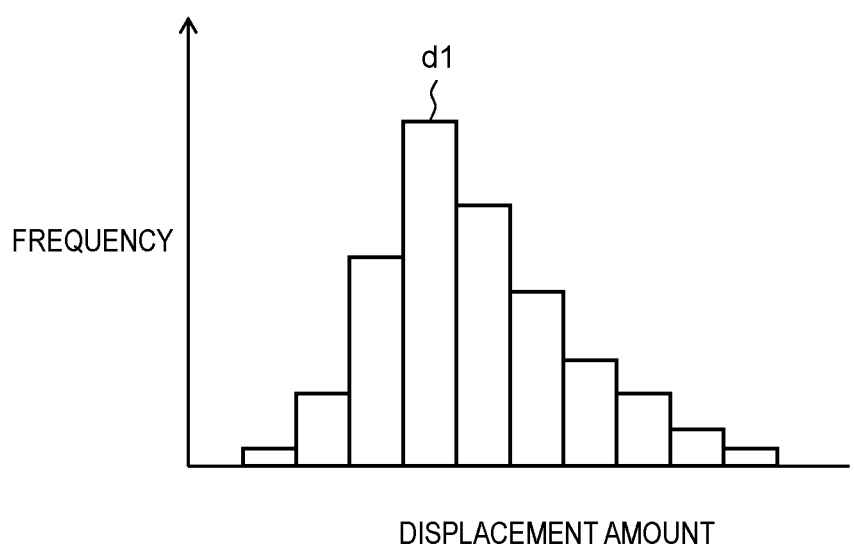
Figure 8B:
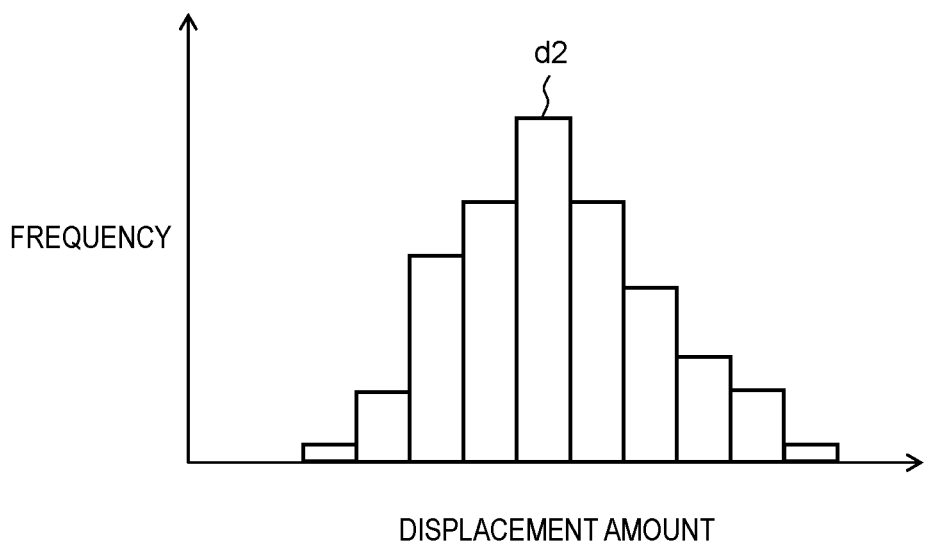

Each of FIGS. 8A and 8B is a diagram illustrating one example of the histogram generated by calibrator 250 for each local area. In FIGS. 8A and 8B, vertical axes represent a frequency, and horizontal axes represent a displacement amount. The histograms illustrated in FIGS. 8A and 8B are examples of histograms with mutually different aggregation periods and classified by an identical local area, an identical axle number, and an identical speed. A reason that shapes of these histograms are different is that road surface temperatures are mutually different, deterioration states of the road surfaces are mutually different, or the like, in these aggregation periods.

Upon the generation of the histogram for each local area, calibrator 250 extracts a characteristic of the histogram (step S170). Then, calibrator 250 calculates a displacement coefficient of the corresponding local area based on the characteristic of the histogram and the second information stored in storage unit 270. Then, calibrator 250 updates the displacement coefficient stored in storage unit 270 to the calculated displacement coefficient (step S180). Herein, the characteristic of the histogram indicates a representative value of the displacement amount obtained from the shape of the histogram, such as an average, a mode, a maximum, a minimum, or an average of lower levels with a certain fraction. A case where the mode of the histogram is used as the characteristic of the histogram is described herein as one example.

Storage unit 270 stores, as the second information, the axle load value of the first axle of the vehicle in which the traffic frequency is expected to be highest in road 103.

Calibrator 250 calculates the displacement coefficient by dividing the second information by the mode serving as the representative value of the displacement amount obtained from the shape of the histogram.

For example, calibrator 250 calculates displacement coefficient α1 based on the histogram illustrated in FIG. 8A and the following expression (1).

$$\alpha 1 = w1/d1 \qquad (1)$$

wherein the second information is represented by w1, and the mode of the histogram illustrated in FIG. 8A is represented by d1.

Further, for example, calibrator 250 calculates displacement coefficient α2 based on the histogram illustrated in FIG. 8B and the following expression (2).

$$\alpha 2 = w1/d2 \qquad (2)$$

wherein the second information is represented by w1, and the mode of the histogram illustrated in FIG. 8B is represented by d2.

It is to be noted that, if the expected characteristic of the histogram cannot appropriately be obtained, such as the case where precision of the histogram is low because of a small number of traveling vehicles (for example, lower than or equal to a certain number), calibrator 250 may calculate the displacement coefficient by using a substitute value instead of the mode. For example, calibrator 250 may use a displacement coefficient in a past time period, or may continuously use the displacement coefficient which has been used before updating the histogram, as the substitute value.

Further, the histogram of the displacement amounts may have a plurality of frequency peak values. In this case, calibrator 250 may use an average, a mode, a maximum, or a minimum within a certain range of a displacement amount. With this configuration, a stable characteristic of the histogram can be obtained.

It is to be noted that, when displacement coefficient α depends on a speed of a vehicle, speed calculator 230 calculates speed v of the vehicle from a movement amount of the vehicle in captured images, in which road 103 is continuously captured in a time-series manner. Also, calibrator 250 may calculate displacement coefficient α(v) for each speed v. Further, calibrator 250 may update the histogram or calculate the displacement coefficient only when the speed is within a certain range (for example, when speed v of the vehicle <20 km/h).

In FIG. 4B, after calculating the displacement coefficient, calibrator 250 overwrites the displacement coefficient stored in storage unit 270 by using the calculated displacement coefficient, thereby updating the displacement coefficient (step S180).

After the process in step S180 is ended, load meter 200 proceeds again to the process in step S110, and repeats the processes in step S110 and subsequent steps.

It is to be noted that calibrator 250 may notify the outside of the need to calibrate the displacement coefficient without automatically updating the displacement coefficient. For example, before step S180, calibrator 250 notifies a manager on the outside of the system of the need to calibrate the displacement coefficient by using notification unit 280 through wired or wireless communication. Then, after the manager confirms the notification, calibrator 250 may update the displacement coefficient. Further, load measuring system 1 may function as a system that notifies timing for executing conventional calibration by performing only notification.

1-3. Effects and Other Benefits

As described above, calibration device 300 according to the first exemplary embodiment detects the displacement amount caused by the axle load of vehicle 102 traveling on road 103 from the captured image captured by external imaging device 101. Calibrator 250 generates the histogram of the displacement amounts by aggregating the displacement amounts during the passage of the plurality of vehicles. Calibrator 250 can update the displacement coefficient stored in storage unit 270 by using the characteristic of this histogram and the second information about the axle load recorded in storage unit 270.

Accordingly, when load meter 200 is calibrated, there is no need to perform calibration work by preparing a vehicle whose axle load is known. Therefore, calibrator 250 can automatically implement calibration of load measuring system 1.

Further, calibrator 250 can select the axle that can easily obtain a shape characteristic of the histogram by selectively generating the histogram for the axle number. Accordingly, calibration precision improves. Further, calibrator 250 can select the speed that can easily obtain the shape characteristic of the histogram by selectively generating the histogram for the speed of the vehicle. Accordingly, the calibration precision improves.

Further, calibrator 250 may calculate the displacement coefficient based only on the shape of the histogram corresponding to the first axle (the forefront axle of the vehicle) as the axle number. For example, it is difficult to precisely calculate the axle load of the axle other than the first axle due to an influence of a load placed on a platform of the vehicle. On the other hand, a load of an engine of the vehicle is applied to the axle load of the first axle, and the axle load of the first axle is hardly affected by a weight of the load on the platform of the vehicle. Accordingly, the axle load of the first axle is calculated more precisely than the axle loads of the other axles. Accordingly, calibrator 250 can precisely calculate the displacement coefficient by calculating the displacement coefficient based only on the shape of the histogram corresponding to the first axle.

Further, when the displacement is measured using an image, it is desirable that calibration device 300 calibrate the displacement coefficient for each position of road 103. With this configuration, multipoint calibration can be easily implemented by automatic calibration. Accordingly, cost and labor for maintenance and management of the measuring system can be reduced.

Further, even when the calibration is not performed automatically, calibration device 300 can automatically detect timing to be calibrated. Accordingly, updating work can be performed in a necessary and sufficient frequency.

The displacement coefficient for calculating the axle load of the vehicle is corrected in the present exemplary embodiment. However, a displacement coefficient for calculating a load of a vehicle may be corrected. A load meter previously records a relation between the load of the vehicle and an axle load of the vehicle. The load meter can calculate the load of the vehicle by measuring the axle load of the vehicle. As with load meter 200, this load meter generates a histogram of the displacement amounts, and updates the displacement coefficient for calculating the load of the vehicle based on a shape of the histogram.

The load meter measures the axle load of the vehicle in the present exemplary embodiment. However, the load meter may measure a load of an entire vehicle in an area where the entire vehicle is placed. In this case, a detector detects displacement amounts at positions of a plurality of axles, and calculates an average of the displacement amounts. As with load meter 200, this load meter generates a histogram of the averages of the displacement amounts, and updates a displacement coefficient for calculating the load of the vehicle based on a shape of the histogram.

Further, storage unit 270 may record a histogram of loads or axle loads of a vehicle traveling on a road. Moreover, calibrator 250 may update a displacement coefficient based on the shape of the histogram of the displacement amounts and a shape of the histogram of the loads or the axle loads of the vehicle.

1-4. Modified Example

A load meter according to a modified example will be described with reference to FIGS. 8C and 8D. It is to be noted that a load meter according to the modified example has a configuration similar to the configuration of above-described load meter 200.

Figure 8C:
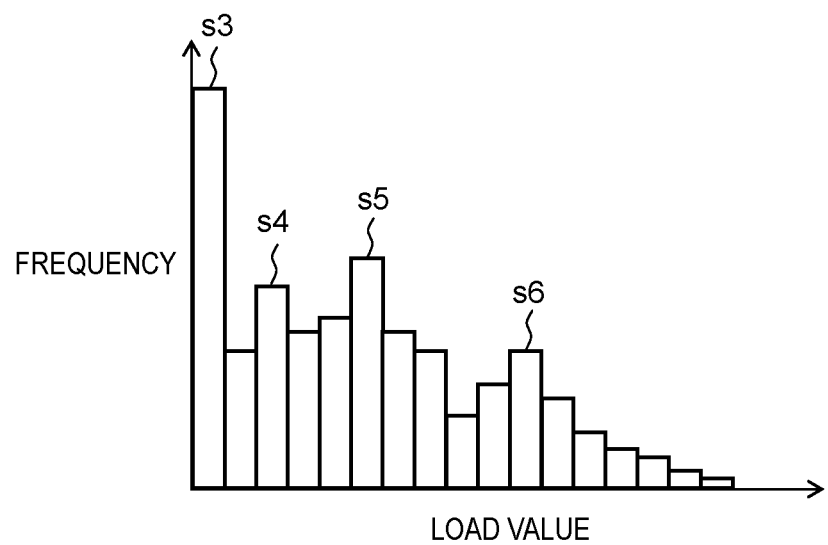

FIG. 8C is a diagram illustrating one example of a histogram of load values acquired in advance. More specifically, the histogram in FIG. 8C is generated by using a calibrated load sensor or load meter. In the present modified example, storage unit 270 stores information indicating this histogram.

In the histogram in FIG. 8C, a mode of output values is frequency s3. The histogram in FIG. 8C has three peak values (frequency s4, frequency s5, and frequency s6) other than frequency s3.

Figure 8D:
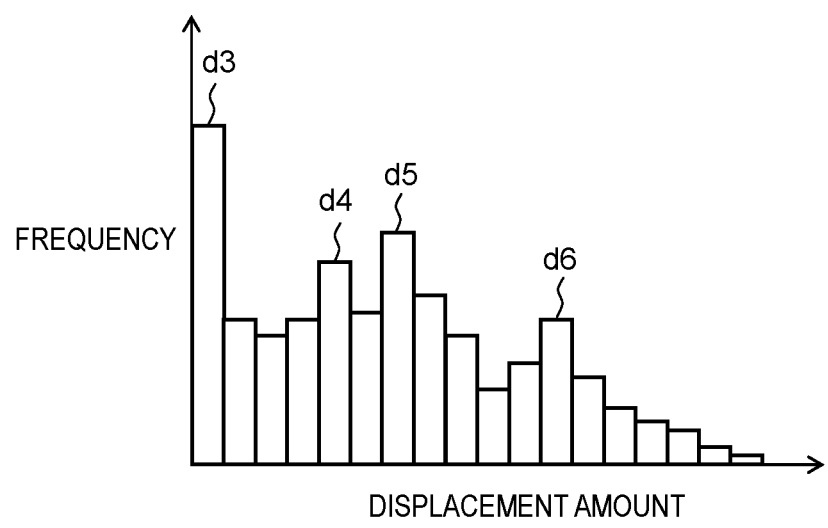

FIG. 8D is a diagram illustrating one example of a histogram of displacement amounts generated by calibrator 250. The histogram in FIG. 8D is generated from captured images of a road at a position closer to a position of the road in which the above-described load sensor is installed. In other words, the histogram in FIG. 8C corresponds to the histogram in FIG. 8D.

In the histogram in FIG. 8D, a mode of the displacement amounts is frequency d3. The histogram in FIG. 8D has three peak values (frequency d4, frequency d5, and frequency d6) other than frequency d3. Herein, as illustrated in FIGS. 8C and 8D, it is considered that frequency s3 corresponds to frequency d3. Similarly, it is considered that frequency s4, frequency s5, and frequency s6 respectively correspond to frequency d4, frequency d5, and frequency d6.

Calibrator 250 of calibration device 300 in the present modified example updates a displacement coefficient based on shapes of the histogram in FIG. 8C and the histogram in FIG. 8D. Specifically, calibrator 250 calculates the displacement coefficient such that axle load values at frequencies s3 to s6 in FIG. 8C substantially coincide with axle load values corresponding to the displacement amounts at frequencies d3 to d6 in FIG. 8D, respectively. With this configuration, calibrator 250 can update the displacement coefficient by using the highly reliable existing histograms generated by measuring axles of many vehicles. Further, calibrator 250 can calculate the displacement coefficient more precisely by using characteristics of the plurality of histograms (that is, the peak values of the plurality of histograms).

It is to be noted that, upon the calculation of the displacement coefficient, calibrator 250 may not use frequency s3 and frequency d3 serving as the modes. In the present modified example, a vehicle corresponding to the mode of the histogram is a vehicle having a light axle load. When the light axle load is measured, an error easily occurs in the measurement of the axle load. Accordingly, frequency s3 and frequency d3 serving as the modes easily include many errors. Because of this, calibrator 250 can precisely calculate the displacement coefficient by not using frequency s3 and frequency d3. As described above, calibrator 250 may update the displacement coefficient based only on a shape of a histogram corresponding to a section that does not include the mode (frequency d3) in the shape of the histogram in FIG. 8D.

Further, in the present modified example, calibrator 250 calculates the displacement coefficient by using the peak values of the histogram. However, calibrator 250 may calculate the displacement coefficient by using other shape characteristics of the histogram. For example, calibrator 250 may use a position serving as a valley of the histogram as the shape characteristic of the histogram.

Second Exemplary Embodiment

Herein, a load meter according to a second exemplary embodiment configured by modifying a part of the configuration of load meter 200 in the first exemplary embodiment will be described as one aspect of the present disclosure.

Figure 9:
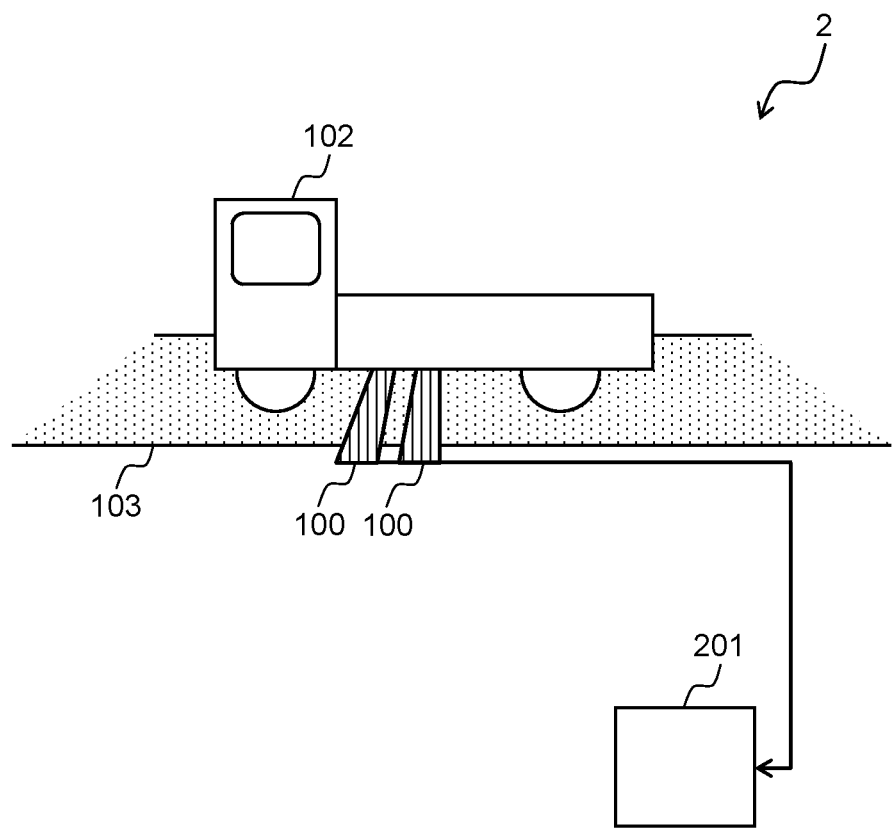

FIG. 9 is a view schematically illustrating one example of a state in which an axle load is measured according to the second exemplary embodiment of the present disclosure. As illustrated in FIG. 9, load measuring system 2 according to the second exemplary embodiment includes two load sensors 100 and load meter 201.

Figure 10:
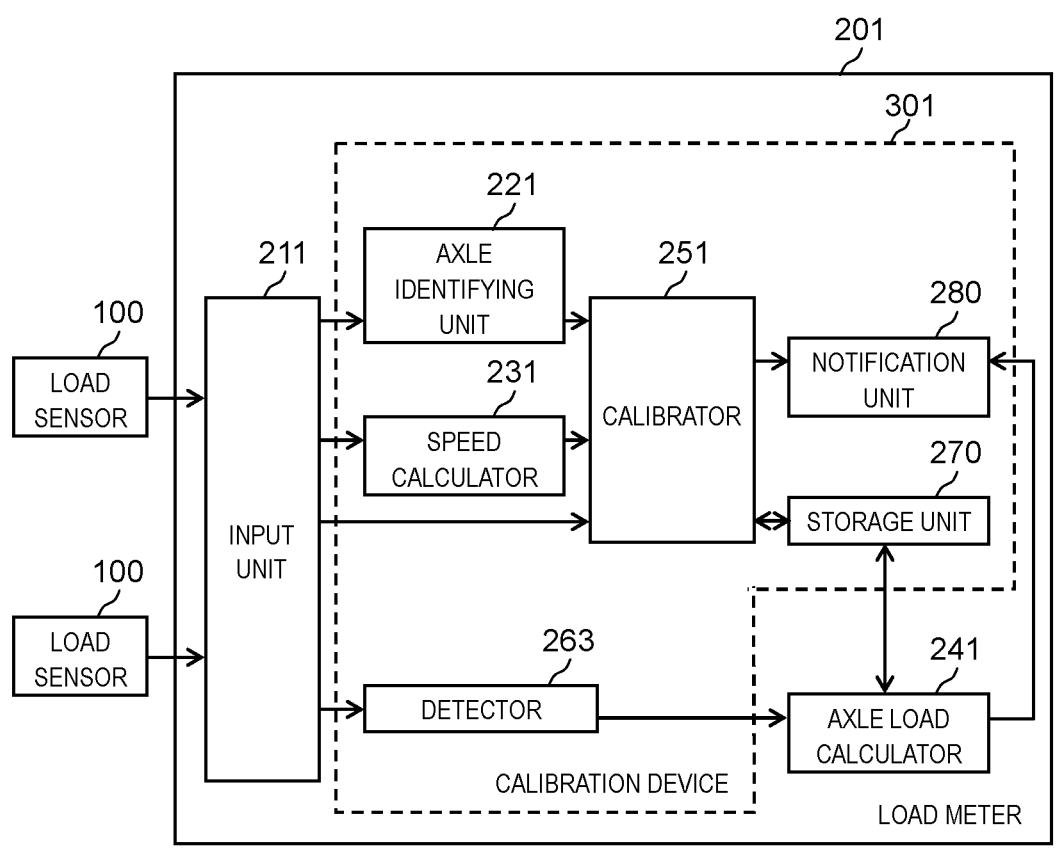

Load meter 200 in the first exemplary embodiment acquires a captured image from imaging device 101, and calculates a road surface displacement, an axle number, and a speed from this image. On the other hand, in load meter 201 in the second exemplary embodiment, as illustrated in FIGS. 9 and 10, input unit 211 acquires an output value of load sensor (a strain gauge, a piezoelectric element, or the like) 100 installed in road 103. Load meter 201 detects a displacement amount from the output value of load sensor 100. Herein, as illustrated in FIG. 9, two or more load sensors 100 are installed adjacent to each other, and a positional relation of load sensors 100 is already known.

Hereafter, a detail of this load meter 201 will be described with reference to the drawings, focusing on differences from load meter 200 in the first exemplary embodiment.

2-1. Configuration

FIG. 10 is a block diagram illustrating a configuration of load meter 201 in the second exemplary embodiment.

As illustrated in FIG. 10, load meter 201 includes input unit 211, axle load calculator 241, and calibration device 301. Calibration device 301 includes axle identifying unit 221, speed calculator 231, calibrator 251, detector 263, storage unit 270, and notification unit 280.

As illustrated in FIG. 10, load meter 201 is different from load meter 200 (see FIG. 2) in the first exemplary embodiment in that input unit 211 acquires the output value of load sensor 100.

Axle identifying unit 221 counts a number of axles from a number of changes in the output value of load sensor 100 acquired by input unit 211 accompanied by a passage of a vehicle. If a certain amount of time has passed since the output of load sensor 100, axle identifying unit 221 judges the passage of the vehicle. Similarly, speed calculator 231 measures the changes in the output value of load sensor 100 acquired by input unit 211 accompanied by the passage of the vehicle. Then, speed calculator 231 calculates a speed of the vehicle by using a passage time between the plurality of load sensors 100 and a known installation distance between load sensors 100. Instead of the displacement amount in the first exemplary embodiment, calibrator 251 and storage unit 270 each use the output value of load sensor 100 acquired by input unit 211. Similarly, instead of the displacement amount in the first exemplary embodiment, axle load calculator 241 calculates an axle load by using the output value of load sensor 100 acquired by input unit 211. Detector 263 calculates a displacement amount from the output value of load sensor 100.

2-2. Operation

Load meter 201 performs, as its characteristic operation, a second measurement process configured by modifying a part of the first measurement process in the first exemplary embodiment.

Specifically, the second measurement process is different from the first measurement process in that a procedure of steps S10 to S30 in the flowchart of FIG. 4A in the first exemplary embodiment is omitted. Further, the second measurement process is different from the first measurement process in that detector 263 treats an amount of change in the output value of load sensor 100 as a displacement amount. Further, in step S120, axle identifying unit 221 identifies an axle number from the number of changes in the output value of load sensor 100. Further, in step S130, speed calculator 231 calculates a speed of the vehicle from a time difference of changes in the output values of the plurality of load sensors 100 and the installation distance between load sensors 100. The other operation is identical to the operation in the first exemplary embodiment.

2-3. Effects and Other Benefits

As described above, load meter 201 uses the output value obtained by load sensor 100. Although input information is different from the input information in the first exemplary embodiment, calibrator 251 aggregates the output values of load sensor 100 accompanied by the passage of ordinary passing vehicles through the operation identical to the operation in the first exemplary embodiment. With this configuration, calibration of load meter 201 can be automatically performed. Accordingly, cost and labor for maintenance and management of the measuring system can be reduced.

Further, even when the calibration is not performed automatically, calibration device 301 can automatically judge timing to be calibrated. Accordingly, updating work can be performed in a necessary and sufficient frequency.

Other Exemplary Embodiments

As described above, the first and second exemplary embodiments have been described as an illustration of the technique disclosed in the present application. However, the technique in the present disclosure is not limited to those, and can be also applied to exemplary embodiments in which changes, replacements, additions, omissions, or the like are made as appropriate.

(1) The present disclosure has been described that load meter 200 is an example of the configuration provided with input unit 210 receiving an input of a captured image of road 103 captured by imaging device 101. However, if load meter 200 can acquire the captured image, load meter 200 is not necessarily provided with input unit 210. For example, load meter 200 may include an imaging unit for generating a captured image, instead of including input unit 210. Further, the captured image used by axle load position identifying unit 261 may be a captured image captured by the imaging unit. This configuration eliminates a need of the external imaging device.

(2) The present disclosure has been described that load meter 200 is an example of the configuration implemented in such a way that a microprocessor in a computer provided with the microprocessor and a memory executes a program stored in the memory. However, if load meter 200 has a function equivalent to the function in the above-described implementation example, load meter 200 is not necessarily limited to the configuration example implemented according to the above-described implementation example. For example, load meter 200 may be an example of the configuration in which a part of or all of components constituting load meter 200 are implemented by a dedicated circuit.

(3) The present disclosure has been described that load meter 200 is an example of the configuration for recognizing a tire of a vehicle by an image processing and identifying an area on road 103 corresponding to the lowermost point of the tire as an axle load position. However, the method for identifying the axle load position is not necessarily limited to the above-mentioned method. For example, load meter 200 may identify a position where a displacement amount locally becomes the maximum as the axle load position.

(4) In the present disclosure, axle identifying unit 220 (one example of a vehicle type recognition unit) may recognize a vehicle type from the captured image, and calibrator 250 may selectively generate a histogram for a specific vehicle type. A shape characteristic of the histogram can be easily obtained by selecting the vehicle type. Accordingly, the calibration precision improves.

(5) In the present disclosure, detector 260 may calculate reliability of the displacement amount from the captured image. Further, calibrator 250 may aggregate the displacement amounts and generate the histogram of the displacement amounts, only when the reliability is higher than a predetermined value. A correlation coefficient, sharpness of distribution of correlation functions, or the like, in case of using a correlation method, can be used as the reliability. The calibration precision is improved by using a highly precise displacement detection result.

(6) In the present disclosure, a captured image may be a monochrome image, a color image, or a multispectral image. In addition, light to be captured in an image may be ultraviolet ray, near infrared ray, or far infrared ray, besides visible light.

(7) The present disclosure has been described by using an example of the asphalt-paved road surface as the road surface of road 103. However, the road surface of road 103 may be, in addition to the asphalt-paved road surface, a road surface formed of another pavement material, such as concrete. Further, the road surface of road 103 may be a road surface of the above-described paved road surface partially coated with a plate material, a sheet material, a coating material, or the like. To more precisely and significantly obtain displacement based on an image, the road surface of road 103 may be coated with one of the above-mentioned materials, and the coated area may be defined as an area from which displacement is to be detected.

(8) The components (function blocks) in load meters 200, 201 may be individually implemented as single chips, or a single chip may include a part of or all of the components, by means of a semiconductor device, such as an integrated circuit (IC) or large scale integration (LSI). The method of implementing integrated circuitry is not limited to the LSI, and implementation may be achieved by means of dedicated circuitry or a general-purpose processor. A field programmable gate array (FPGA) for which programming is possible after LSI fabrication, or a reconfigurable processor allowing reconfiguration of connections and settings of circuit cells within an LSI, may also be used in implementing integrated circuitry. Further, when an integrated circuit implementation technique comes out to replace the LSI as a result of the development of semiconductor technique or another technique derived from the semiconductor technique, the function blocks may be integrated by using that technique. For example, application of biotechnology is possible.

(9) All of or a part of various processes described above may be implemented by a hardware product such as an electronic circuit, or may be implemented by using software. It is to be noted that the process using software is implemented in such a way that the processor in the load meter executes the program stored in the memory. Furthermore, the program may be recorded in a recording medium and may be distributed or circulated. For example, the distributed program is installed in another device including a processor, and the program is executed by the processor. In this way, the device can execute the above-described processes.

(10) The embodiments implemented by any combination of the components and functions of the above-mentioned exemplary embodiments are included in the scope of the present disclosure.

INDUSTRIAL APPLICABILITY

The calibration device according to the present disclosure is widely applicable to a load meter for measuring an axle load.

REFERENCE MARKS IN THE DRAWINGS 1, 2: load measuring system
100: load sensor
101: imaging device
102: vehicle
103: road
200, 201: load meter
210, 211: input unit
220, 221: axle identifying unit
230, 231: speed calculator
240, 241: axle load calculator
250, 251: calibrator
260, 263: detector
261: axle load position identifying unit
262: displacement amount detector
270: storage unit
280: notification unit
300, 301: calibration device

The invention claimed is:

1. A calibration device configured to calibrate a load meter that measures an axle load of a vehicle, the calibration device comprising:
 a detector configured to detect a displacement amount corresponding to displacement caused on a road by the axle load of the vehicle; and
 a calibrator configured to aggregate a plurality of the displacement amounts detected by the detector to generate a histogram of the displacement amounts, and to update a displacement coefficient for calculating the axle load of the vehicle based on a shape of the histogram,
 wherein the calibrator updates the displacement coefficient based only on the shape of the histogram generated by a measurement of a first axle serving as a forefront axle of the vehicle.

2. The calibration device according to claim 1, wherein the detector detects the displacement amount from a captured image in which the road is captured.

3. The calibration device according to claim 1, wherein the detector detects the displacement amount from an output value of a load sensor installed in the road.

4. The calibration device according to claim 1, comprising an axle identifying unit configured to identify the first axle of the vehicle.

5. The calibration device according to claim 1, comprising a speed calculator configured to calculate a speed of the vehicle,
wherein the calibrator generates the histogram for each speed calculated by the speed calculator, and updates the displacement coefficient based on the shape of the histogram.

6. The calibration device according to claim 1, comprising a vehicle type recognizer configured to recognize a type of the vehicle,
wherein the calibrator generates the histogram for each type recognized by the vehicle type recognizer, and updates the displacement coefficient based on the shape of the histogram.

7. The calibration device according to claim 2, wherein the detector calculates reliability of the displacement amount, and
the calibrator aggregates the plurality of the displacement amounts only when the reliability is higher than a predetermined value.

8. The calibration device according to claim 1, wherein the calibrator updates the displacement coefficient based only on the shape of the histogram corresponding to a section that does not include a mode of the histogram.

9. The calibration device according to claim 1, wherein the calibrator updates the displacement coefficient only when a predetermined condition is satisfied.

10. The calibration device according to claim 1, comprising a notification unit,
wherein the notification unit performs notification when a difference between a displacement coefficient before being updated by the calibrator and the displacement coefficient updated by the calibrator is a predetermined reference value or more.

11. A calibration method for calibrating a load meter that measures an axle load of a vehicle, the calibration method comprising:
detecting a displacement amount corresponding to displacement caused on a road by the axle load of the vehicle;
aggregating a plurality of the displacement amounts detected in the detecting to generate a histogram of the displacement amounts; and
updating a displacement coefficient for calculating the axle load of the vehicle based on a shape of the histogram,
wherein in the updating, the displacement coefficient is updated based only on the shape of the histogram generated by a measurement of a first axle serving as a forefront axle of the vehicle.

* * * * *